United States Patent
Resch et al.

(10) Patent No.: US 10,565,392 B2
(45) Date of Patent: Feb. 18, 2020

(54) SECURE AND VERIFIABLE UPDATE OPERATIONS

(71) Applicant: International Business Machines Corporation, Armonk, NY (US)

(72) Inventors: Jason K. Resch, Chicago, IL (US); Ravi V. Khadiwala, Bartlett, IL (US); Brian F. Ober, Lake in the Hills, IL (US); Greg R. Dhuse, Chicago, IL (US); Andrew D. Baptist, Mt. Pleasant, WI (US); Scott M. Horan, Clarendon Hills, IL (US); Wesley B. Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 15/824,957

(22) Filed: Nov. 28, 2017

(65) Prior Publication Data

US 2019/0163924 A1   May 30, 2019

(51) Int. Cl.
*G06F 21/62* (2013.01)
*G06F 21/64* (2013.01)
(Continued)

(52) U.S. Cl.
CPC ........ *G06F 21/6218* (2013.01); *G06F 3/0622* (2013.01); *G06F 21/62* (2013.01);
(Continued)

(58) Field of Classification Search
CPC ....... G06F 21/62; G06F 3/067; H04L 67/1097
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Teshome Hailu
(74) *Attorney, Agent, or Firm* — Garlick & Markison; Timothy W. Markison; Timothy D. Taylor (57) ABSTRACT

A method begins by storage units of a dispersed storage network (DSN) receiving data access requests regarding data that is dispersed storage error encoded to produce a set of encoded data slices. The method continues by some of the storage units determining whether at least some of the data access requests are verifiable update requests. When some of the data access requests are the verifiable update requests, the method continues by determining whether the data access requests are addressing data stored, or to be stored, within a verifiable update region affiliated within the some of the storage units. When within the verifiable update region, the method continues by generating and transmitting request verification information to other storage units of the some of the storage units. The method continues by executing the data access requests when a desired level of consistency of the request verification information is determined.

14 Claims, 7 Drawing Sheets

(51) Int. Cl.
*G06F 3/06* (2006.01)
*H04L 29/08* (2006.01)
*G06F 21/60* (2013.01)

(52) U.S. Cl.
CPC ............. *G06F 21/64* (2013.01); *G06F 3/067* (2013.01); *G06F 21/602* (2013.01); *H04L 67/1097* (2013.01)

(58) Field of Classification Search
USPC ....................................................... 726/27
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,311,186 | B2 | 4/2016 | Resch et al. |
| 9,443,099 | B2 * | 9/2016 | Grube ................. G06F 11/1076 |
| 9,646,019 | B2 * | 5/2017 | Factor ................. G06F 21/6218 |
| 10,303,889 | B2 * | 5/2019 | Gonzalez ............. G06F 21/604 |
| 2001/0020254 | A1 * | 9/2001 | Blumenau ............ G06F 9/468 709/229 |
| 2002/0062422 | A1 | 5/2002 | Butterworth et al. |
| 2002/0083339 | A1 * | 6/2002 | Blumenau ............ H04L 63/08 726/23 |
| 2002/0091945 | A1 * | 7/2002 | Ross ...................... G06F 21/33 726/21 |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0115324 | A1 * | 6/2003 | Blumenau ............ G06F 9/468 709/225 |
| 2004/0015723 | A1 * | 1/2004 | Pham .................. H04L 63/0407 726/27 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2014/0337666 | A1 | 11/2014 | Resch et al. |
| 2017/0132079 | A1 | 5/2017 | Khadiwala et al. |
| 2017/0161157 | A9 | 6/2017 | Resch |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

SECURE AND VERIFIABLE UPDATE OPERATIONS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
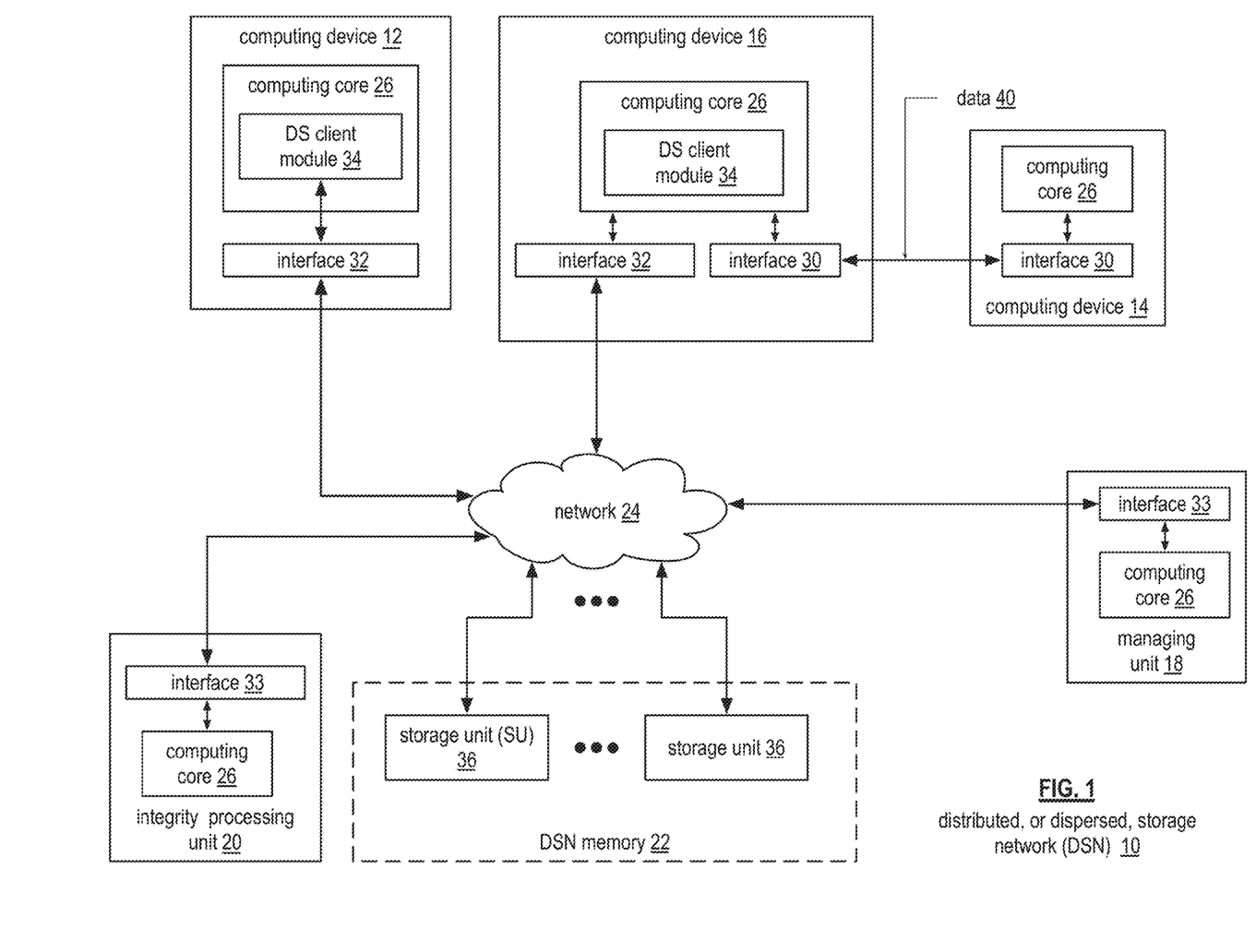
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
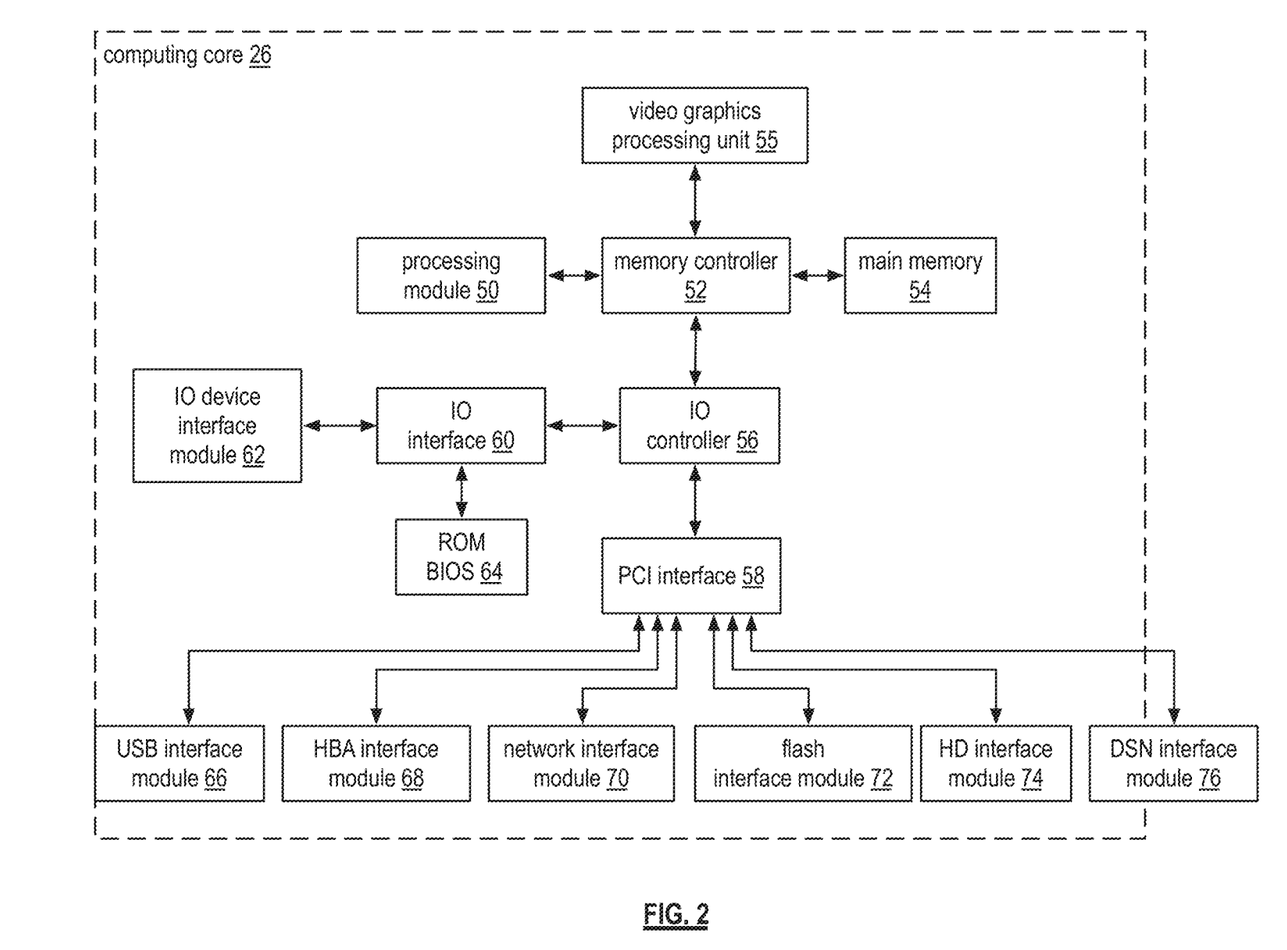
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data 40 on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
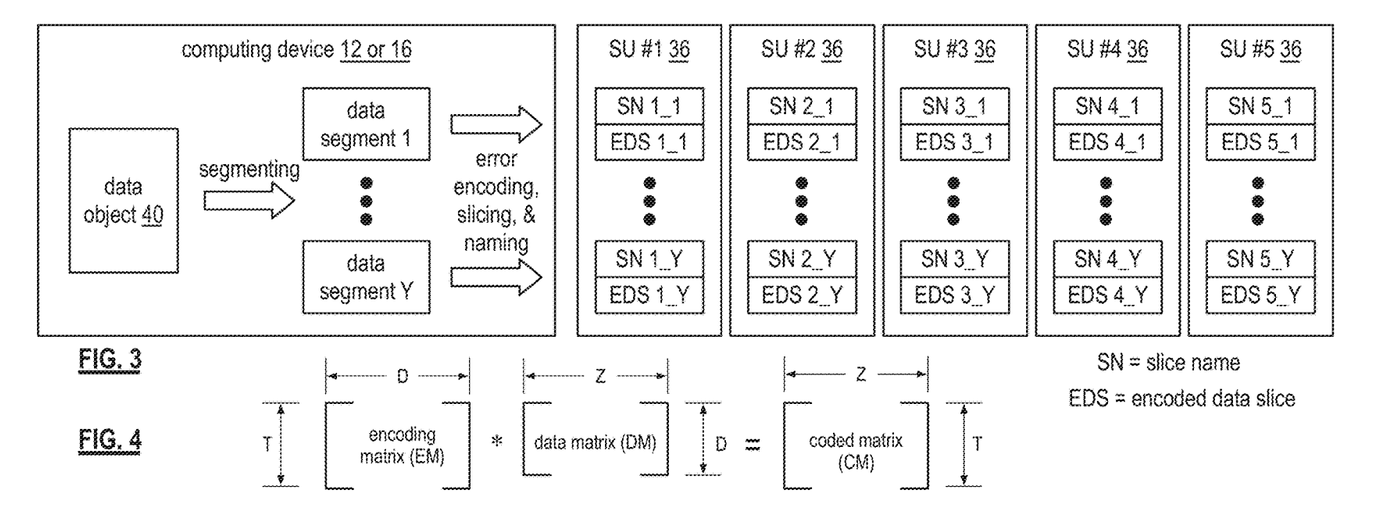
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 5, 6:
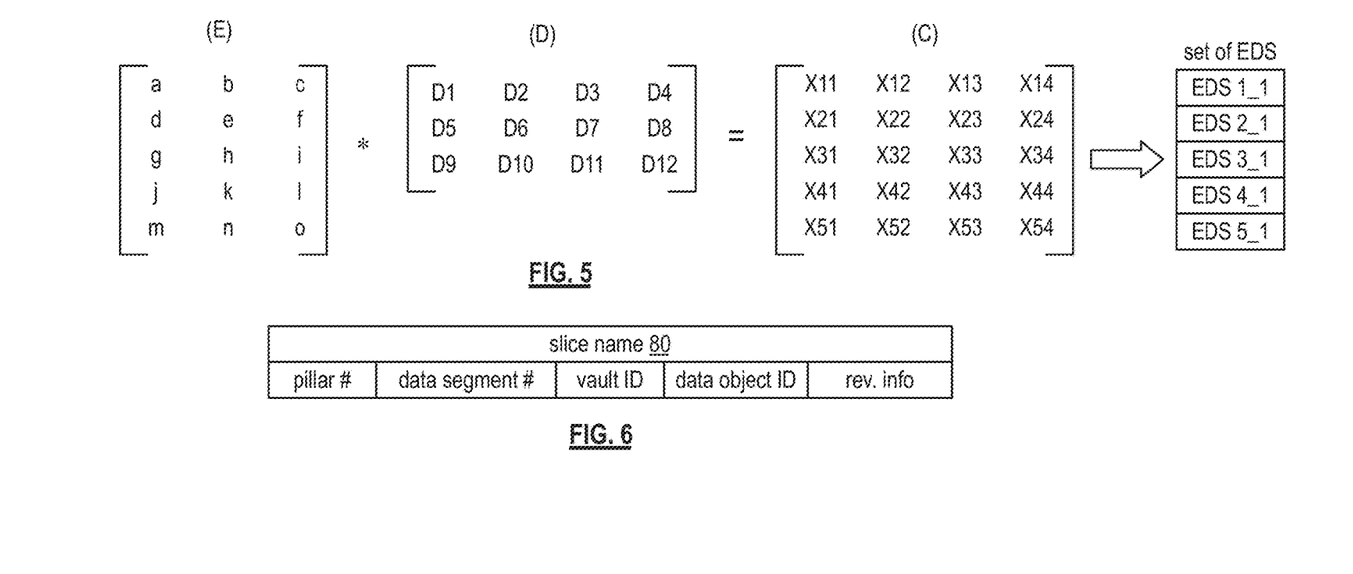
FIG. 5 is a schematic block diagram of a specific example of an error encoding function in accordance with the present invention.
FIG. 6 is a schematic block diagram of an example of a slice name of an encoded data slice (EDS) in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
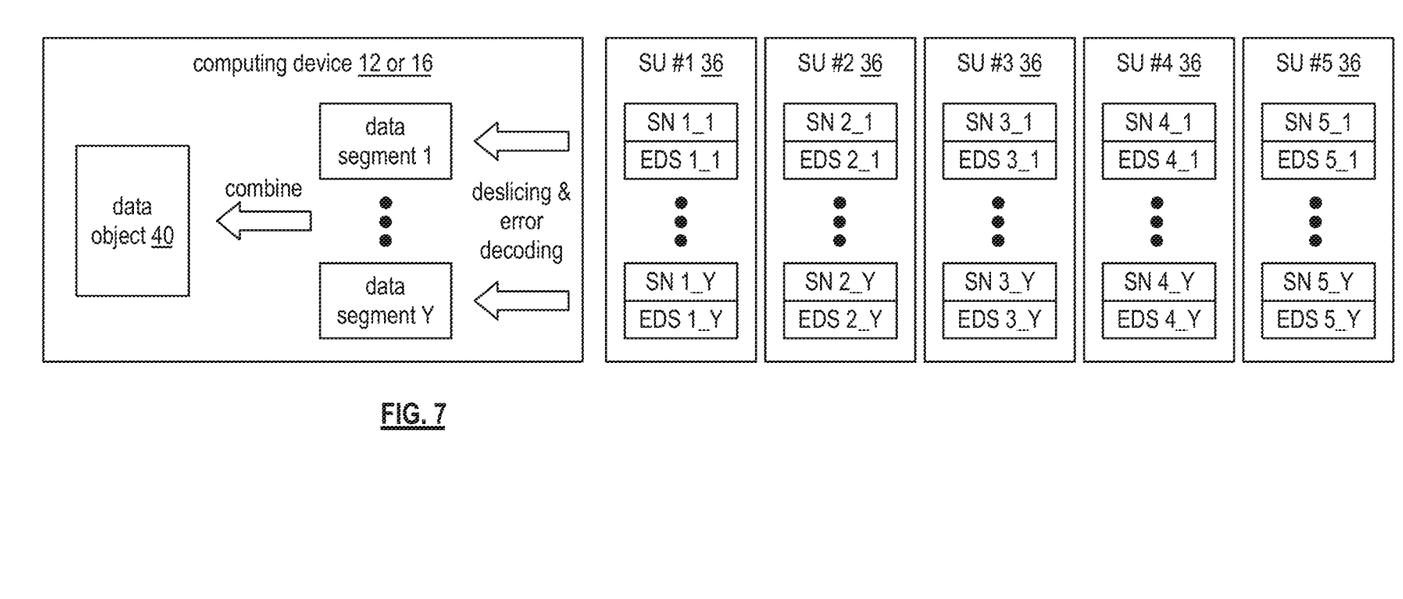
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
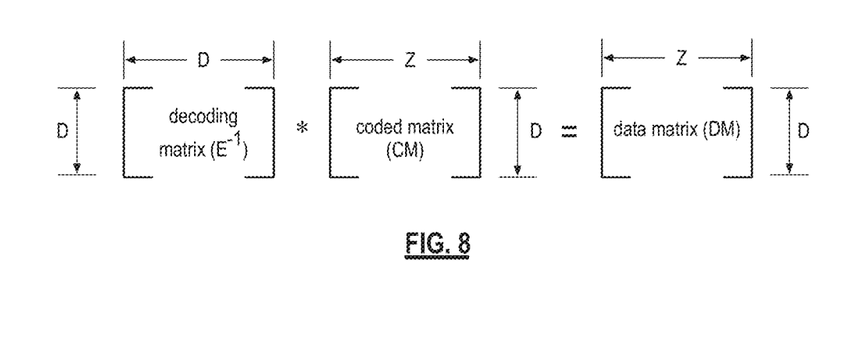
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
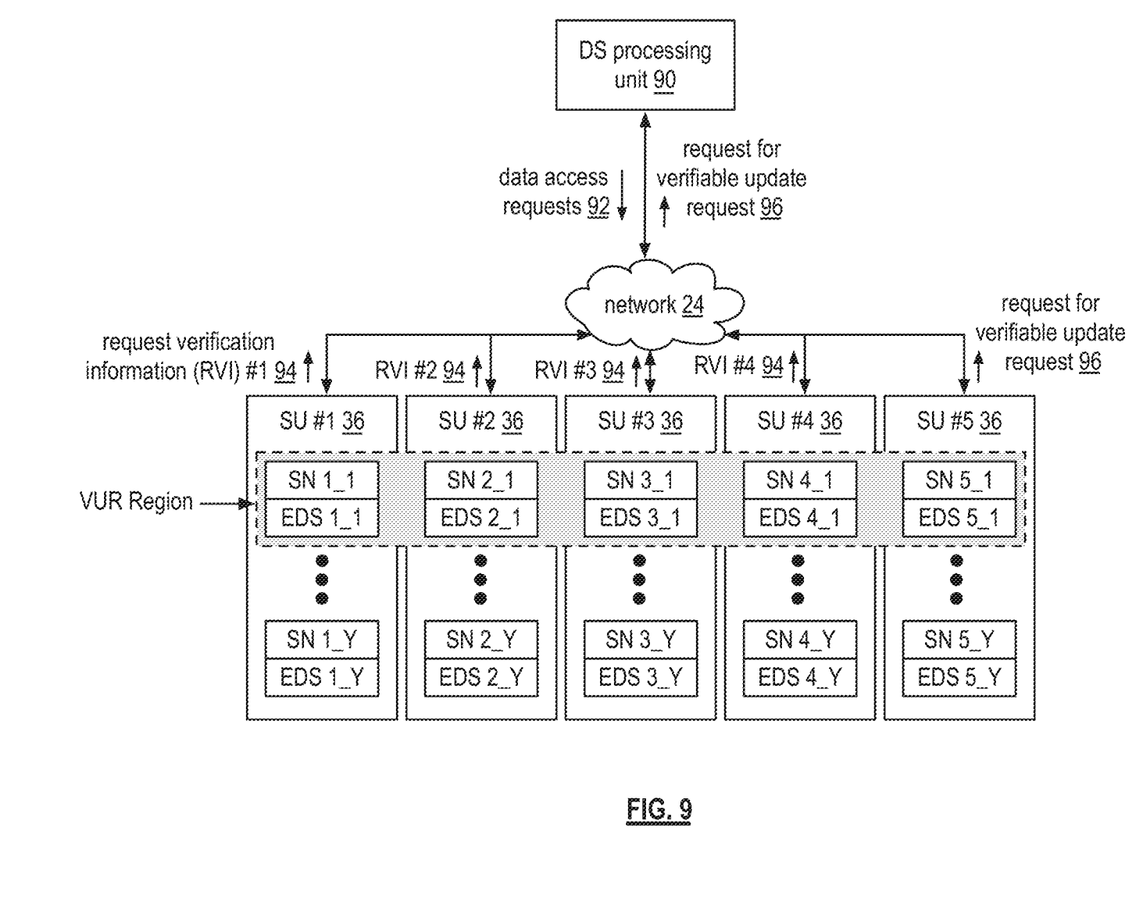
FIG. 9 is a schematic block diagram of an embodiment of a verifiable update region within a dispersed storage network (DSN) in accordance with the present invention.

FIG. 9 is a schematic block diagram of a verifiable update region within a dispersed storage network (DSN). The DSN includes a DS processing unit 90, the network 24 of FIG. 1, and a set of storage units 36 (e.g., SU #1-SU #5 36). Note the DS processing unit 90 may be implemented by one of the computing devices 12-16, the managing unit 18, the integrity processing unit 20 and the DS client module 34 of FIG. 1. Each storage unit 36 of the set of storage units 36 includes memory, and at least a portion (e.g., a vault, a container, a storage type within the vault, a class within the vault, etc.) of the memory is configured to be a verifiable update request (VUR) region 98. The VUR portion 98 of the memory may only be accessed for a write, overwrite, or update request by using a verifiable update request. Further, previously confirmed (e.g., passed one or more verifiable update request checks) data within the verifiable update region portion may not be modified (e.g., via a delete request, a write finalize request, a rollback request, etc.) unless a storage unit 36 receives request verification information (RVI) 94 from the set of storage units 36 and determines that a threshold number of the request verification information 94 indicates the data access request 92 is valid.

In an example of operation, the set of storage units 36 receive a set of data access requests 92 regarding data (e.g., an update to encoded data slices EDS 1_1-EDS 5_1). At least some storage units 36 receive at least some of the data access requests 92 of the set of data access requests 92 and determine whether the at least some of the data access requests are verifiable update requests. A storage unit 36 of the at least some storage units 36 may determine a data access request 92 is a verifiable update request region 98 request by identifying within the data access request 92 one or more of an original data source, a new data source, an encoded data slice (e.g., updated, new), an instruction to generate an encoded data slice, dispersed storage error encoding parameters, a new slice revision, and a slice name. For example, the storage unit 36 determines a data access request 92 is a verifiable update request region 98 request by identifying within the data access request 92 an original data source (e.g., a data object, a data segment, a dispersed data structure, etc.), an encoded data slice and a new data source.

When a storage unit 36 of the at least some of the storage units 36 determines a data access request 92 is a verifiable update request, the storage unit 36 then determines whether the data access request 92 is addressing data stored, or to be stored within the storage unit's verifiable update request region 98 of memory. For example, a first storage unit SU#1 36 makes the determination by determining the data access request 92 includes a logical address that corresponds to a logical address range of a vault configured for the verifiable update request region 98 portion of the storage units' memory.

When the at least some of the data access requests 92 are addressing data stored, or to be stored, within the verifiable update request region 98, each of the at least some of the storage units 36 generate request verification information 94 (e.g., RVI #1, RVI #2, RVI #3 and RVI #4). The request verification information 94 includes one or more of a favorability indication of a verifiable update request check (e.g., favorable, unfavorable), the data (e.g., original data, new data), a hash of the data, a revision number, and slice name information (e.g., data segment number, a vault identifier, a data object identifier, and revision information). For example, a second storage unit 36 performs a hash function on the original data to produce a first hash value, and a hash function on the new data to produce a second hash value. The second storage unit then includes the first and second hash values in the request verification information 94.

When a storage unit (e.g., SU#5 36) receives a data access request 92 that is not a verifiable update request, but is addressing data stored, or to be stored, within the storage unit's verifiable update request region 98 memory portion, the storage unit 36 may send a request for a verifiable update request 96 to the computing device (e.g., the DS processing unit 90, the computing device 14 of FIG. 1, etc.). When the storage unit 36 receives a response to the request 96, the storage unit 36 may then continue to process the data access request as described in reference to FIGS. 9-11. Alternatively, or in addition to, when the storage unit receives a response to the request 96, the storage unit may implement one or more of a second and third verifiable update request check. The second verifiable update request check includes verifying that an update operation from an existing encoded data slice to a new encoded data slice is a consistent operation (e.g., both the original data and the new data have valid data structures, both the original data and the new data have consistent formats, it is possible to transition the original data into the new data, etc.). The third verifiable update request check includes receiving within the data access request 92, a previously created encoded data slice and new data (e.g., data object, data segment, etc.), dispersed storage error encoding the new data to produce a new encoded data slice, and verifying that the previously created encoded data slice substantially matches the new encoded data slice. Note the fifth storage unit may also send RVI to the other storage units, as the data access request 92 was addressing data with the fifth storage unit's VUR region 98 portion of memory.

As an example of generating the verifiable update request check, the fourth storage unit (e.g., SU#4 36) determines whether a data access request 92 is the verifiable update request by dispersed storage error encoding data included in a corresponding data access request 92 to produce an authenticating encoded data slice. Having produced the authenticating encoded data slice, the fourth storage unit 36 determines whether the authenticating encoded data slice substantially matches an existing encoded data slice (e.g., a previously stored encoded data slice, a received encoded data slice, etc.) of the set of encoded data slices. When the authenticating slice substantially matches the existing encoded data slice, the fourth storage unit 36 determines the data access request 92 is the verifiable update request and indicates the verifiable update request check is favorable. When the authenticating slice does not substantially match the existing encoded data slice, the storage unit determines the data access request is not the verifiable update request and indicates the verifiable update request check is unfavorable. The fourth storage unit 36 then includes the verifiable update request check in the request verification information 94.

Having generated the request verification information 94, each storage unit 36 of the at least some storage 36 transmits a corresponding one of the request verification information 94 to other storage units 36 of the set of storage units 36. For example, a first storage unit (e.g., SU #1 36) sends request verification information (RVI) #1 94 to storage units SU #2-5 36. As another example, a second storage unit 36 sends RVI #2 94 to the first storage unit 36, a third storage unit 36, a fourth storage unit 36 and a fifth storage unit 36.

When a storage unit 36 of the storage units 36 receives RVI 94 from the other storage units 36, the storage unit 36 determines whether the desired level of consistency has been met before executing a corresponding one of the data access requests 92. For example, the second storage unit (e.g., SU#2 36) receives RVI #1 94 from the first storage unit 36, RVI #3 from the third storage unit 36, and RVI #4 94 from the fourth storage unit 36. The second storage unit 36 then determines that the desired level of consistency has been met when information within a favorable number of the received RVI 94 are substantially the same. In one instance, the second storage unit 36 determines the desired level of consistency has not been met when all of the request verification information 94 from each of the at least some of the storage units 36 is not substantially the same (e.g., a hash value of the data included in RVI #1 does not substantially match the hash value of the data included in RVI #3). In another instance, the second storage unit 36 determines the desired level of consistency has been met when the request verification information from at least a threshold number (e.g., 3) of the at least some of the storage units is substantially the same (e.g., slice name information included in each of RVI #1, RVI #3 and RVI #4 are substantially similar). Having determined the desired level of consistency has been met, the second storage unit 36 executes the corresponding one of the at least some of the data access requests 92. For example, the second storage unit 36 dispersed storage error encodes new data included in the data access request 92 to produce a new second encoded data slice of a set of new encoded data slices, and overwrites a previously stored encoded data slice with the new encoded data slice.

Figure 10:
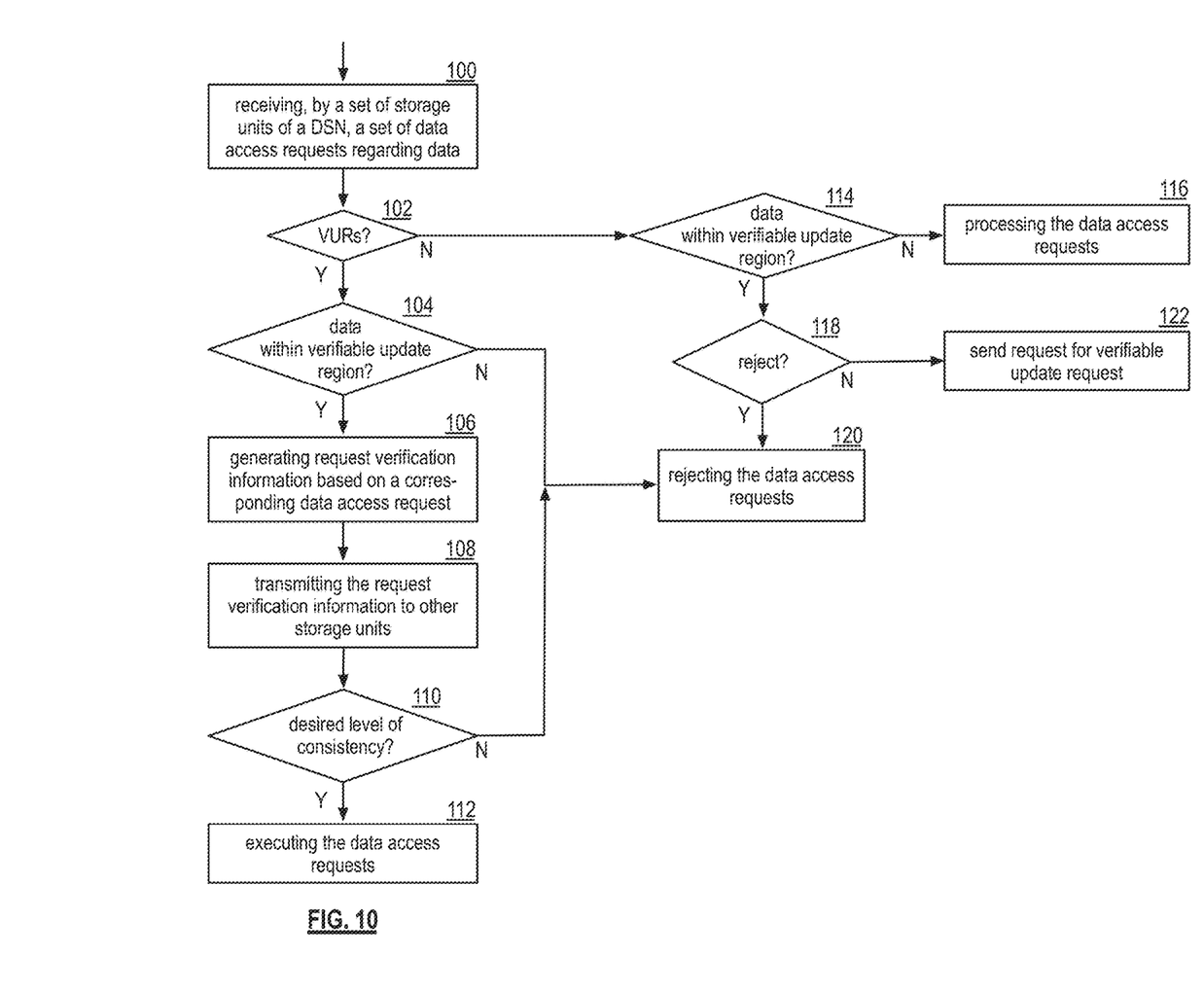
FIG. 10 is a logic diagram of an example of a method of performing secure and verifiable update operations in accordance with the present invention.

FIG. 10 is a logic flow diagram of an example of a method of performing secure and verifiable update operations in a dispersed storage network (DSN). The method begins with step 100, where a set of storage units receive a set of data access requests regarding data, that is or is to be dispersed storage error encoded to produce a set of encoded data slices. The method continues with step 102, where at least some of the storage units determine whether at least some of the data access requests are verifiable update requests. When the at least some of the data access requests are the verifiable update requests, the method branches to step 114.

When the at least some of the data access requests are the verifiable update requests, the method continues with step 104, where by the at least some of the storage units determine whether the at least some of the data access requests are addressing data stored, or to be stored, within a verifiable update region (e.g., all or a portion of a DSN memory (e.g., vault, container, storage type or class within a vault)) affiliated with the at least some of the storage units. When the at least some of the data access requests are not addressing data stored, or to be stored, within the verifiable update region, the method branches to step 120. When the at least some of the data access requests are addressing data stored, or to be stored, within the verifiable update region, the method continues to step 106, where each of the at least some of the storage units generates request verification information based on a corresponding one of the at least some of the data access requests.

The method continues with step 108, where by the each of the at least some of the storage units transmits the request verification information to other storage units of the at least some of the storage units. The method continues to step 110, where each of the at least some of the storage units determine whether a desired level of consistency of the request verification information has been met. When the desired level of consistency has not been met, the method branches to step 120. Alternatively, a storage unit may request additional request verification information from other storage units. For example, when the desired level of consistency of a first type (e.g., a revision number) of request verification information has not been met, a storage unit may request a second type (e.g., a hash value) of request verification information from one or more other storage units. When the desired level of consistency has been met, the method continues with step 112, where the each of the at least some of the storage units executes the at least some of the data access requests.

When the at least some of the data access requests are not the verifiable update requests, the method continues with step 114, where the at least some of the storage units determine whether the at least some of the data access requests are addressing data stored, or to be stored, within the verifiable update region affiliated with the at least some of the storage units. When the at least some of the data access requests are not addressing data stored, or to be stored, within the verifiable update region, the method continues with step 116, where the at least some of the storage units process the at least some of the data access requests. When the at least some of the data access requests are addressing data stored, or to be stored, within the verifiable update region, the method continues with step 118, where the at least some of the storage units determine whether to reject the at least some of the data access requests or to send a request for the verifiable update request to a computing device from which the set of data access requests was received. As an example, a storage unit may determine to send a request for the verifiable update request to a computing device when the computing device is associated with a known user. As another example, a storage unit may determine to reject a data access request when the computing device is associated with an anonymous user.

When the determination is to send the request, the method continues with step 122, where the at least some of the storage units send the request for the verifiable update request to the computing device. When the determination is to not send the request, the method continues with step 120. At step 120, the at least some of the storage units reject the data access requests.

Figure 11:
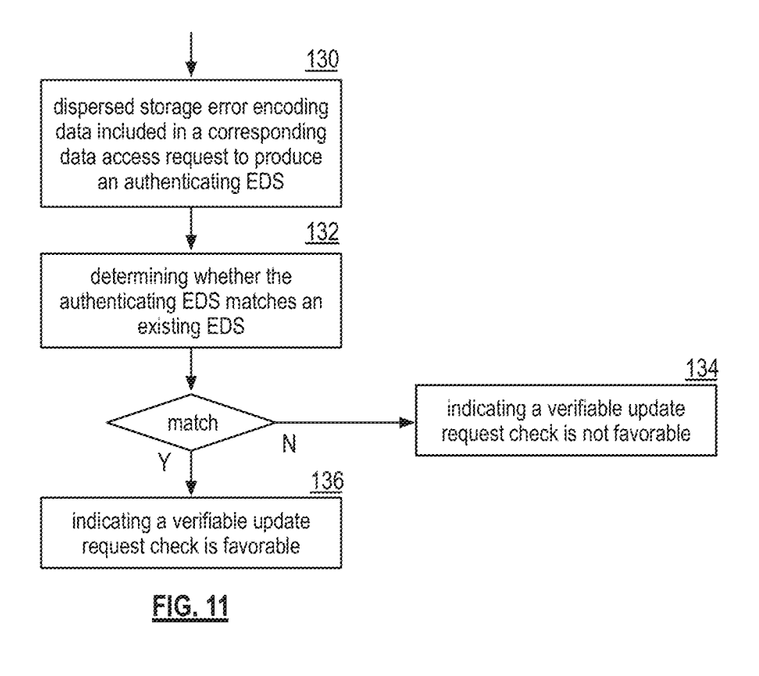
FIG. 11 is a schematic block diagram of another embodiment of determining verifiable update requests in accordance with the present invention.

FIG. 11 is a logic flow diagram of an example of a method of determining verifiable update requests. The method continues with step 130, where a storage unit of the at least some storage units dispersed storage error encodes the data included in the corresponding one of the at least some of data access requests to produce an authenticating encoded data slice.

The method continues with step 132, where the storage unit determines whether the authenticating encoded data slice substantially matches an existing encoded data slice of the set of encoded data slices. The existing encoded data slice may be one or more of a previously authenticated encoded data slice, a previously stored encoded data slice and an encoded data slice received within the data access request from a computing device.

When the authenticating encoded data slice substantially matches the existing encoded data slice, the method continues with step 134, where the storage unit indicates a verifiable update request check is favorable. When the authenticating encoded data slice does not substantially match the existing encoded data slice, the method continues with step 136, where the storage unit indicates a verifiable update request check is unfavorable. Note the storage unit may include the favorability of the verifiable update request check in a verification information request that is sent to the other storage units. Further note when the verifiable update request check is unfavorable, the storage unit may send a unique alert message to other storage units indicating a possible malicious data access request.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    receiving, by a set of storage units of a dispersed storage network (DSN), a set of data access requests regarding data, wherein the data is dispersed storage error encoded to produce a set of encoded data slices;
    determining, by at least some of the storage units, whether at least some of the data access requests are verifiable update requests; and
    when the at least some of the data access requests are the verifiable update requests:
        determining, by the at least some of the storage units, whether the at least some of the data access requests are addressing data stored, or to be stored, within a verifiable update region affiliated with the at least some of the storage units; and
        when the at least some of the data access requests are addressing data stored, or to be stored, within the verifiable update region:
            generating, by each of the at least some of the storage units, request verification information based on a corresponding one of the at least some of the data access requests;
            transmitting, by the each of the at least some of the storage units, the request verification information to other storage units of the at least some of the storage units; and
            executing, by the at least some of the storage units, the at least some of the data access requests when the at least some of the storage units determine a desired level of consistency of the request verification information.

2. The method of claim 1, wherein the determining, by a storage unit of the at least some of the storage units, a verifiable update request of the verifiable update requests comprises:
    identifying within the request one or more of:
        an original data source;
        a new data source;
        an encoded data slice;
        an instruction to generate an encoded data slice;
        dispersed storage error encoding parameters;
        a new slice revision; and
        a slice name.

3. The method of claim 1, wherein the determining whether the at least some of the data access requests are the verifiable update requests comprises:
    dispersed storage error encoding, by a storage unit of the at least some storage units, the data included in the corresponding one of the at least some of the data access requests to produce an authenticating encoded data slice;
    determining whether the authenticating encoded data slice substantially matches an existing encoded data slice of the set of encoded data slices;
    when the authenticating encoded data slice substantially matches the existing encoded data slice:
        indicating a verifiable update request check is favorable; and
    when the authenticating encoded data slice does not substantially match the existing encoded data slice:
        indicating the verifiable update request check is not favorable.

4. The method of claim 1, wherein the generating the request verification information comprises one or more of:
    including a favorability indication of a verifiable update request check;
    including the data;
    including a hash of the data;
    determining a revision number; and
    generating slice name information.

5. The method of claim 1, wherein the determining the desired level of consistency comprises one of:
    determining the request verification information from each of the at least some of the storage units is substantially the same; and
    determining the request verification information from at least a threshold number of the at least some of the storage units is substantially the same.

6. The method of claim 1 further comprises:
    when the at least some of the data access requests are not the verifiable update requests:
        determining, by the at least some of the storage units, whether the at least some of the data access requests are addressing data stored, or to be stored, within the verifiable update region affiliated with the at least some of the storage units; and
        when the at least some of the data access requests are not addressing data stored, or to be stored, within the verifiable update region:
            processing, by the at least some of the storage units, the at least some of the data access requests.

7. The method of claim 6 further comprises:
    when the at least some of the data access requests are addressing data stored, or to be stored, within the verifiable update region:
        determining, by the at least some of the storage units, to reject the at least some of the data access requests or to send a request for the verifiable update request to a computing device from which the set of data access requests was received; and
        when the determination is to send the request:
            sending the request for the verifiable update request to the computing device.

8. A storage unit of a set of storage units of a dispersed storage network (DSN) comprises:
    memory;
    an interface; and
    a processing module, wherein the memory and the interface are operably coupled to the processing module, and wherein the processing module is operable to:
        receive, via the interface, a data access request of a set of data access requests regarding data, wherein the data is dispersed storage error encoded to produce a set of encoded data slices;

determine whether the data access request is a verifiable update request; and when the data access request is the verifiable update request:
  determine whether the data access request is addressing data stored, or to be stored, within a verifiable update region affiliated with the storage unit; and
  when the data access request is addressing data stored, or to be stored, within the verifiable update region:
    generate a request verification information based on the data access request;
    transmit, via the interface, the request verification information to other storage units of the set of storage units; and
    execute the data access request when the other storage units determine a desired level of consistency of the request verification information.

9. The storage unit of claim 8, wherein the processing module is operable to determine a verifiable update request of the verifiable update requests by:
  identifying within the request one or more of:
    an original data source;
    a new data source;
    an encoded data slice;
    an instruction to generate an encoded data slice;
    dispersed storage error encoding parameters;
    a new slice revision; and
    a slice name.

10. The storage unit of claim 8, wherein the processing module is further operable to determine whether the data access request is the verifiable update request by:
  dispersed storage error encoding the data included in the data access request to produce an authenticating encoded data slice;
  verifying the authenticating encoded data slice substantially matches an existing encoded data slice of the set of encoded data slices;
  when the authenticating encoded data slice substantially matches the existing encoded data slice:
    indicating a verifiable update request check was favorable; and
  when the authenticating encoded data slice does not substantially match the existing encoded data slice:
    indicating the verifiable update request check was not favorable.

11. The storage unit of claim 8, wherein the processing module is operable to generate the request verification information by one or more of:
  including a favorability indication of a verifiable update request check;
  including the data;
  including a hash of the data;
  determining a revision number; and
  generating slice name information.

12. The storage unit of claim 8, wherein the processing module is operable to determine the desired level of consistency by one of:
  determining the request verification information from each of the at least some of the storage units is substantially the same; and
  determining the request verification information from at least a threshold number of the at least some of the storage units is substantially the same.

13. The storage unit of claim 8, wherein the processing module is further operable to:
  when the data access request is not the verifiable update requests:
    determine whether the data access request is addressing data stored, or to be stored, within the verifiable update region affiliated with the at least some of the storage units; and
    when the data access request is not addressing data stored, or to be stored, within the verifiable update region:
      process the data access request.

14. The storage unit of claim 13, wherein the processing module is further operable to:
  when the data access request is addressing data stored, or to be stored, within the verifiable update region:
    determine to reject the data access request or to send a request for the verifiable update request to a computing device from which the data access request was received; and
    when the determination is to send the request:
      send, via the interface, the request for the verifiable update request to the computing device.

* * * * *